July 21, 1925.
J. E. BARKER
1,546,704
VARIABLE SPEED TRANSMISSION MEANS
Filed Jan. 18, 1923
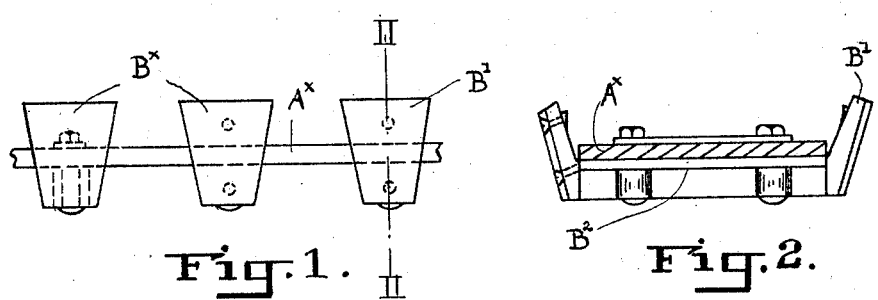
INVENTOR:
John Edward Barker
BY Wm Wallace White
ATTY.

Patented July 21, 1925.

1,546,704

UNITED STATES PATENT OFFICE.

JOHN EDWARD BARKER, OF BRADFORD, ENGLAND.

VARIABLE-SPEED-TRANSMISSION MEANS.

Application filed January 18, 1923. Serial No. 613,321.

*To all whom it may concern:*

Be it known that I, JOHN EDWARD BARKER, a subject of the King of Great Britain and Ireland, residing at 29 Gaythorne Street, Bradford, Yorkshire, England, have invented new and useful Improvements in and Relating to Variable-Speed-Transmission Means, of which the following is a specification.

This invention relates to improvements connected with variable speed transmission means and refers more particularly to improvements in transmission belts of that type which have bevelled edges which operate on the faces of opposite coned members which are moved towards or away from each other as desired.

The usual kind of transmission belt is one in which a belt carries a series of depending blocks having bevelled edges which are faced with leather or the like, and these leather faces bear against the sides of the coned discs. I have found in practice that the pull on these bevelled faces is at that point where the face meets the belt or connecting means or in other words at the top, with the result that the tendency is, during working, to tilt the block, and only permit a portion of the face to bear on the disc, this obviously must decrease the efficiency and give slip. It is my object to overcome this defect and increase the efficiency of the transmission means and to this end I form the blocks of suitable material with their edges suitably tapered or bevelled and faced, and the connecting means, such as a belt, links, or the like, are carried or connected at or about the centre of such blocks, this ensures that the pull is at or about the centre of the block and this to a great extent eliminates the tilting movement before referred to, gives a better grip and increases the efficiency. As an example by using my improved blocks I obtain the same power and efficiency (or rather more) with say a five inch gear as is now obtainable with a six inch gear and as the cost of a larger gear is much above that of a smaller one the saving effected is considerable.

In describing my invention in detail reference is made to the accompanying sheet of drawing in which:—

Fig. 1 is a fragmentary side elevation illustrating a transmission belt constructed in accordance with the present invention; and Fig. 2 is a transverse sectional view thereof taken approximately on the line II—II of Fig. 1.

To carry my invention into effect I will describe same with reference to the ordinary belt from which the belt blocks are carried, but I wish it to be understood that the blocks may be interconnected by other means such as links, chains or the like, providing the interconnecting means lie or are carried at or about the centre line through the blocks or the bevelled edges thereof.

Each block $B^x$ will be in the form of two inclined faces $B'$ a predetermined distance apart and connected by a rib or flange $B^2$ at or about the centre forming as it were an upper channel.

The belt $A^x$ will be seated on and attached to this rib and will thus lie below (and not above) the upper edges of the inclined faces $B'$. (These faces will be suitably faced) therefore when in operation the pull on the blocks will be at or about their centres and the tendency of the blocks to tilt will be either eliminated or greatly reduced and the major face of each bevelled or inclined face $B'$ will be available as a gripping means against the faces of the coned discs. This arrangement will obviously decrease the liability of slipping as compared with blocks suspended from the belt and materially increase the efficiency of the apparatus.

In the present practice the connecting belt is usually of a width equal to that given by the inclined faces at their broadest part. In my improvement the width of the belt $A^x$ will not be greater than the width between the faces at their narrowest point as clearly shown in Fig. 2.

The inclined faces will be faced with leather, metal composition or other suitable means to give the desired friction contact with the coned discs. The usual material from which the block B is constructed is wood. I prefer to construct the blocks $B^x$ from a suitable metal such for example as aluminum or alloy thereof. But in place of castings I may employ stampings suitably made up and constructed either to embrace the belt connection or to carry interconnecting means.

The faces B' will be suitably designed as to area and shape to give the most efficiency.

In the course of my experiments I have found that with a belt five inches wide and blocks supported as heretofore and running on or between suitable coned discs, I obtain about eight horse power with some ten to twelve per cent of slip, whereas on the same apparatus using my improved blocks and a slightly narrower belt I can obtain at least eleven horse power with a slip of about three per cent. From this the advantages will be readily understood.

What I claim as my invention is:—

1. A belt for coned pulleys for variable speed gearing, comprising a series of blocks each having a pair of inclined end walls connected together at their lower portions by a one-piece solid cross bar thereby forming a recess of which said end walls are the sides and the cross bar the bottom, and a connecting belt secured to each of said cross bars between said end walls.

2. A belt for coned pulleys for variable speed gearing, comprising a series of blocks each having a pair of inclined and tapered end walls connected together at their lower portions by a one-piece solid cross bar thereby forming a recess of which said end walls are the sides and the cross bar the bottom, a continuous connecting member secured to all of said cross bars between said end walls, and a facing of flexible material secured to the outer side of each of said end walls.

In testimony whereof I have signed my name to this specification.

JOHN EDWARD BARKER.

Witness:
C. WAUGH.